US011346780B1

(12) United States Patent
Harb et al.

(10) Patent No.: US 11,346,780 B1
(45) Date of Patent: May 31, 2022

(54) RESONANT, MULTI-PASS CAVITY FOR CAVITY RING-DOWN SPECTROSCOPY

(71) Applicant: RingIR, Inc., Albuquerque, NM (US)

(72) Inventors: Charles Charbel Harb, Albuquerque, NM (US); Ruwini Dinushika Rajapaksha, Albuquerque, NM (US); John Michael Roberts, Tijeras, NM (US); Xavier Andrew Moya, Albuquerque, NM (US); Richard Hebden, Clifton Hill (AU)

(73) Assignee: RINGIR, INC., Albuquerque, NM (US)

( * ) Notice: Subject to any disclaimer, the term of this patent is extended or adjusted under 35 U.S.C. 154(b) by 0 days.

(21) Appl. No.: 17/493,448

(22) Filed: Oct. 4, 2021

(51) Int. Cl.
*G01N 21/61* (2006.01)
*G01N 21/03* (2006.01)
*G01N 21/39* (2006.01)

(52) U.S. Cl.
CPC ........... *G01N 21/61* (2013.01); *G01N 21/031* (2013.01); *G01N 2021/391* (2013.01); *G01N 2201/0612* (2013.01)

(58) Field of Classification Search
CPC .. G01N 21/39; G01N 21/3504; G01N 21/031; G01N 21/61; G01N 2201/0612
USPC ........................................................ 356/437
See application file for complete search history.

(56) References Cited

U.S. PATENT DOCUMENTS

| 9,013,700 | B2* | 4/2015 | Aldstadt, III | ......... G01J 3/0232 356/436 |
| 2005/0243876 | A1* | 11/2005 | Kung | ........................ G02F 1/39 372/21 |
| 2006/0132766 | A1* | 6/2006 | Richman | ................... G01J 3/10 356/318 |
| 2008/0111077 | A1* | 5/2008 | Miller | ..................... G01N 21/39 250/339.07 |
| 2009/0323055 | A1* | 12/2009 | Cole | ...................... G01N 21/39 356/300 |
| 2013/0175450 | A1* | 7/2013 | Scherer | .................. G01N 21/39 250/353 |
| 2015/0289782 | A1* | 10/2015 | Peverall | ............. A61B 5/14532 600/532 |

* cited by examiner

*Primary Examiner* — Sunghee Y Gray
(74) *Attorney, Agent, or Firm* — Dickinson Wright PLLC (57) ABSTRACT

Multi-pass cavities for cavity ring-down spectroscopy. The multi-pass cavity includes, in one example, a body, a pair of flat mirrors, a light input coupler, a first turning mirror, a second turning mirror, and a light output coupler. The pair of flat mirrors are positioned parallel to each other within a gas channel of the body. The light input coupler is configured to direct a light beam into the gas channel along a first transmission axis. The first turning mirror is configured to reflect the light beam from the first transmission axis toward the resonance cavity. The light output coupler is configured to direct a first portion of the light beam out of the gas channel and reflect a second portion of the light beam along a second transmission axis. The second turning mirror is configured to reflect the light beam from the second transmission axis to the resonance cavity.

20 Claims, 5 Drawing Sheets

RESONANT, MULTI-PASS CAVITY FOR CAVITY RING-DOWN SPECTROSCOPY

BACKGROUND

Detecting infected patients is one important part of mitigating disease transmission during a pandemic. To this end, cavity ring-down spectroscopy (CRDS) is one technique that can be used to detect infected patients. For example, CRDS can be used for human breath analysis to diagnose SARS-CoV-2 (i.e., COVID-19). CRDS measures changes in the rate of decay of light captured in an optical resonator and relates the change to optical loss along the length of the optical resonator.

SUMMARY

An example of a CRDS setup may include a laser that is used to illuminate an optical cavity comprising at least two reflective mirrors. The sensitivity of a CRDS system is directly related to its effective optical path length. Thus, sensitivity increases as optical path length increases. One technique to increase optical path length is by increasing the distance between the two reflective mirrors. However, increasing the size between the two reflective mirrors also increases the overall footprint of the device. Another technique to increase optical path length is by increasing the number of bounces the light travels between two physical positions. Increasing the number of bounces back and forth effectively increases optical path length (and thus also increases sensitivity) with a smaller impact on the overall footprint of the device. However, each additional bounce may lower the light intensity (and thus lower the sensitivity) due to, e.g., absorption and reflectivity losses. Accordingly, the present disclosure provides multi-pass cavities for cavity ring-down spectroscopy that provide, among other things, additional bounces for a long optical path length without the absorption and reflectivity losses that can degrade sensitivity.

For example, the present disclosure provides a multi-pass cavity for cavity ring-down spectroscopy comprising, in one implementation, a body, a pair of flat mirrors, a light input coupler, a first turning mirror, a second turning mirror, and a light output coupler. The body includes a gas channel formed between a first end of the body and a second end of the body opposite the first end. The pair of flat mirrors are positioned parallel to each other within the gas channel to form a resonance cavity. The light input coupler is configured to direct a light beam into the gas channel along a first light transmission axis perpendicular to a center axis of the resonance cavity. The first turning mirror is configured to reflect the light beam from the first light transmission axis toward the resonance cavity. The light output coupler is configured to receive the light beam from the resonance cavity, direct a first portion of the light beam out of the gas channel, and reflect a second portion of the light beam along a second light transmission axis perpendicular to the center axis of the resonance cavity. The second turning mirror is configured to reflect the light beam from the second light transmission axis to the resonance cavity.

The present disclosure also provides a multi-pass cavity for cavity ring-down spectroscopy comprising, in one implementation, a body, a first rectangular reflector, a second rectangular reflector, a light input coupler, a first round reflector, a second round reflector, and a light output coupler. The body includes a gas inlet port, a gas outlet port, and a hollow channel. The gas inlet port is positioned on a first end of the body. The gas outlet port is positioned on a second end of the body opposite the first end. The hollow channel is formed between the gas inlet port and the gas outlet port. The first rectangular reflector is positioned within the hollow channel and parallel to a center axis of the hollow channel. The second rectangular reflector is positioned within the hollow channel and parallel to the first rectangular reflector to form a resonance cavity. The light input coupler is configured to direct a light beam into the hollow channel along a first light transmission axis perpendicular to a center axis of the resonance cavity. The first round reflector is configured to reflect the light beam from the first light transmission axis toward the resonance cavity. The light output coupler is configured to receive the light beam from the resonance cavity, direct a first portion of the light beam out of the hollow channel, and reflect a second portion of the light beam along a second light transmission axis perpendicular to the center axis of the resonance cavity. The second round reflector is configured to reflect the light beam from the second light transmission axis to the resonance cavity.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description, taken in conjunction with the accompanying drawings. It is emphasized that, according to common practice, the various features of the drawings are not necessarily to-scale. On the contrary, the dimensions of the various features may be—and typically are—arbitrarily expanded or reduced for the purpose of clarity.

NOTATION AND NOMENCLATURE

Various terms are used to refer to particular system components. A particular component may be referred to commercially or otherwise by different names. Further, a particular component (or the same or similar component) may be referred to commercially or otherwise by different names. Consistent with this, nothing in the present disclosure shall be deemed to distinguish between components that differ only in name but not in function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The terminology used herein is for the purpose of describing particular example implementations only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example implementations. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "up," "upper," "top," "bottom," "down," "inside," "outside," "contained within," "superimposing upon," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

"Real-time" may refer to less than or equal to 2 seconds. "Near real-time" may refer to any interaction of a sufficiently short time to enable two individuals to engage in a dialogue via such user interface, and will generally be less than 10 seconds (or any suitable proximate difference between two different times) but greater than 2 seconds.

DETAILED DESCRIPTION

The following discussion is directed to various implementations of the present disclosure. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the disclosure, including the claims, is limited to that implementation.

Figure 1:
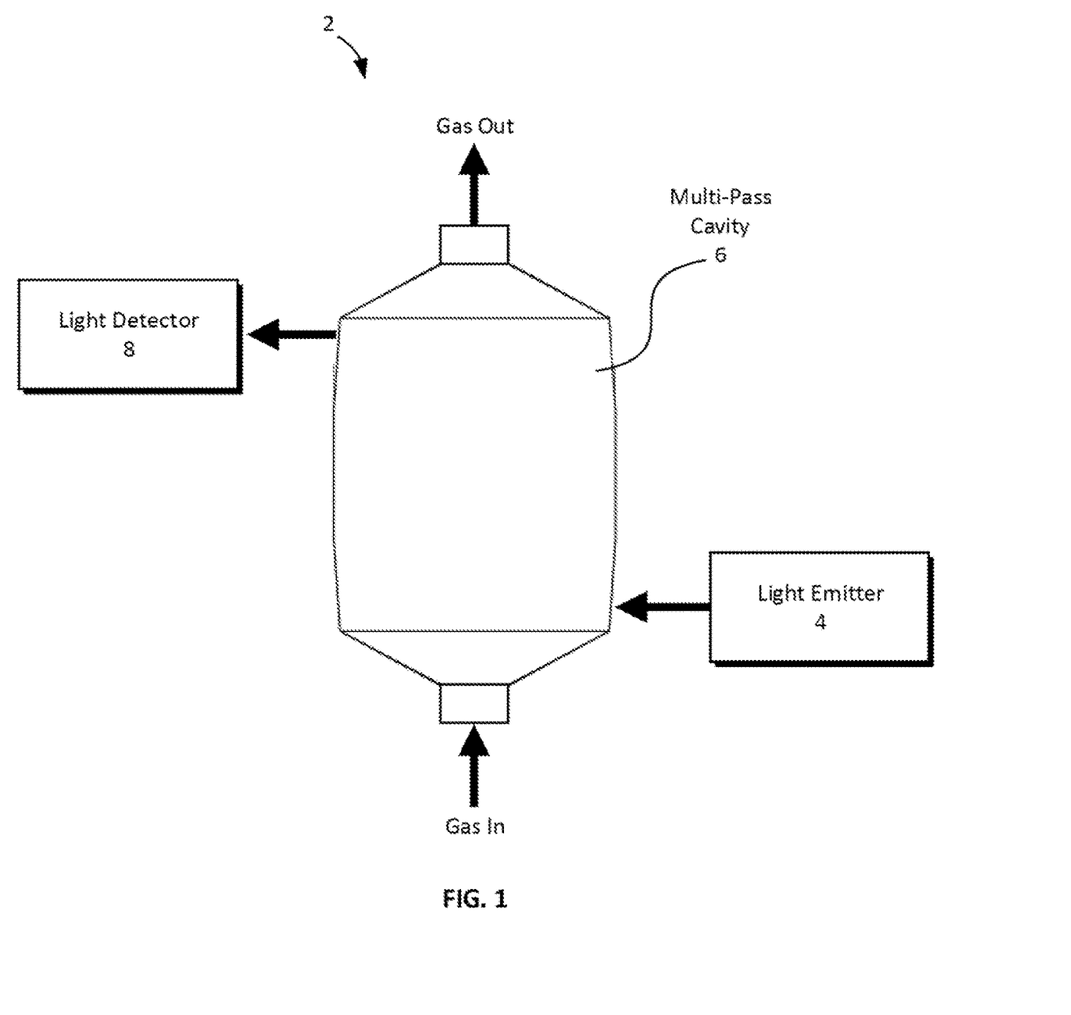
FIG. 1 is a block diagram of an example of a system for cavity ring-down spectroscopy, in accordance with some implementations of the present disclosure.

FIG. 1 is a block diagram of an example of a system 2 for cavity ring-down spectroscopy. The system 2 illustrated in FIG. 1 includes a light emitter 4, a multi-pass cavity 6, and a light detector 8. The system 2 may include fewer, additional, or different components in different configurations than the system 2 illustrated in FIG. 1. For example, in some implementations, the system 2 may include multiple light detectors. As illustrated in FIG. 1, gas flows through the multi-pass cavity 6. The light emitter 4 emits light into the multi-pass cavity 6. For example, the light emitter 4 may include a quantum cascade laser that emits mid-infrared (MIR) light (e.g., between 6 and 12 microns). The light detector 8 (e.g., a Mercury-Cadmium-Telluride [MCT] infrared detector) detects the intensity of light within the multi-pass cavity 6. When the light is in resonance, the intensity builds up in the multi-pass cavity 6 due to constructive interference as will be described in more detail below. The light emitter 4 is then turned off in order to allow the measurement of the exponentially decaying light intensity leaking from the multi-pass cavity 6. During this decay, light is reflected back and forth many times within the multi-pass cavity 6 giving a very long effective path length for the extinction. The exponentially decaying light intensity is due to, among other things, scattering caused by the gas flowing through the multi-pass cavity 6. The composition of gas flowing through the multi-pass cavity 6 can be determined by measuring the decaying exponential. For example, the mole fractions (down to, e.g., the parts per trillion level) of the gas flowing through the multi-pass cavity 6 can be determined by measuring the decaying exponential.

Figure 2:
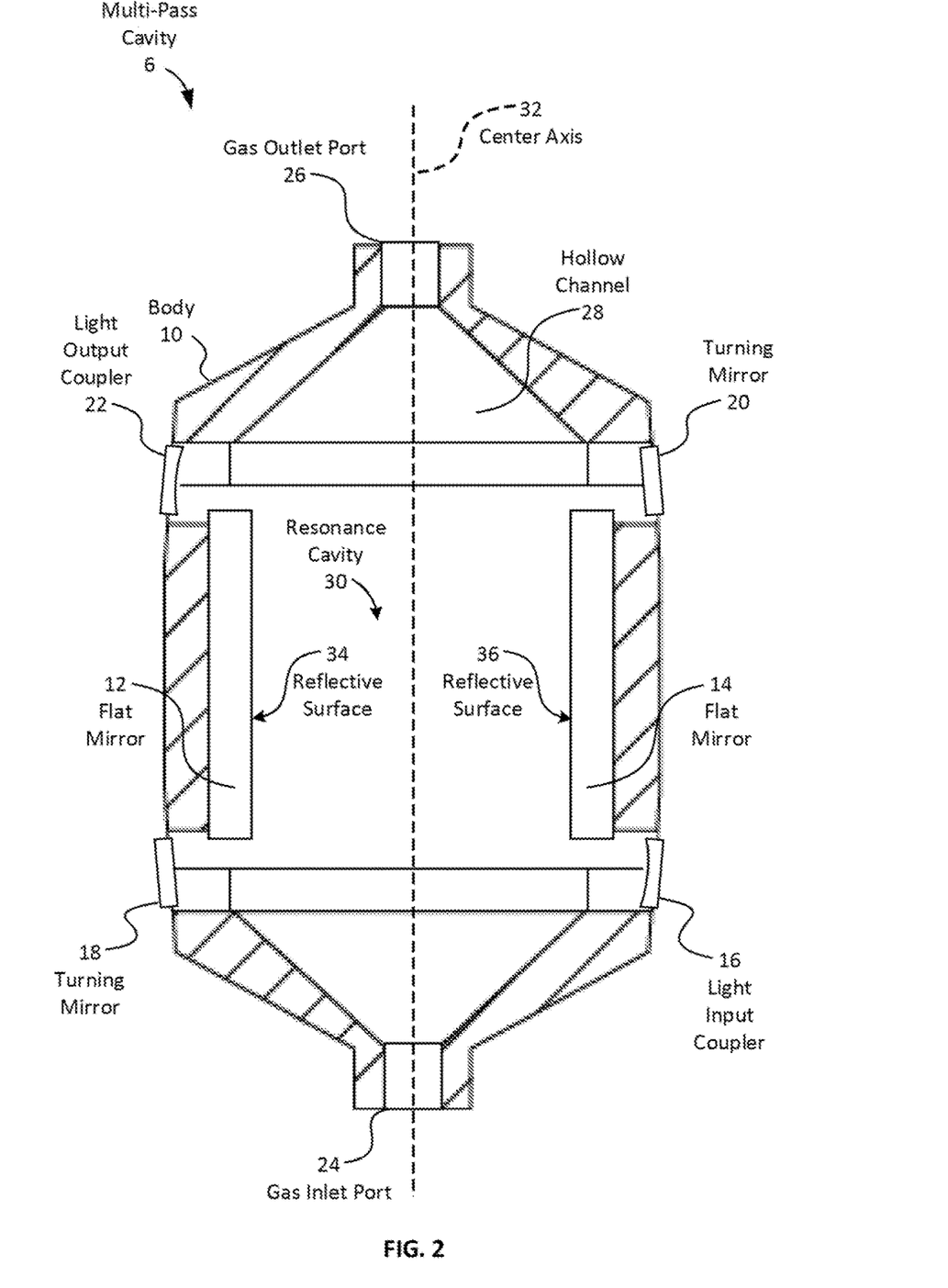
FIG. 2 is a sectional view an example of a multi-pass cavity included in the system for cavity ring-down spectroscopy of FIG. 1, in accordance with some implementations of the present disclosure.

FIG. 2 is a sectional view of an example of the multi-pass cavity 6. The multi-pass cavity 6 illustrated in FIG. 2 includes a body 10, a pair of flat mirrors 12 and 14, a light input coupler 16, a pair of turning mirrors 18 and 20, and a light output coupler 22. The multi-pass cavity 6 may include fewer, additional, or different components in different configurations than the multi-pass cavity 6 illustrated in FIG. 2. The body 10 illustrated in FIG. 2 includes a gas inlet port 24, a gas outlet port 26, and a hollow channel 28 formed therebetween. Gas (e.g., a gas sample) flows into the hollow channel 28 via the gas inlet port 24 and out of the hollow channel 28 via the gas outlet port 26 thereby forming a gas channel in the hollow channel 28. The pair of flat mirrors 12 and 14, the light input coupler 16, the pair of turning mirrors 18 and 20, and the light output coupler 22 comprise optical grade mirrors. Further, the pair of flat mirrors 12 and 14, the light input coupler 16, the pair of turning mirrors 18 and 20, and the light output coupler 22 are configured to provide low-loss. For example, in some implementations, the pair of flat mirrors 12 and 14, the light input coupler 16, the pair of turning mirrors 18 and 20, and the light output coupler 22 comprise super-polished mirrors. Further, the pair of flat mirrors 12 and 14, the light input coupler 16, the pair of turning mirrors 18 and 20, and the light output coupler 22 may have a wavelength-dependent coating deposited onto their substrates, which is designed to coincide with the operating wavelength ranges of both the light emitter 4 and the light detector 8. For example, in some implementations, the light input coupler 16 and the light output coupler 22 may be coated with an epitaxial coating to provide at least 500 parts per million light transmission when the light emitted by the light emitter 4 has a wavelength between 6 and 12 microns.

The pair of flat mirrors 12 and 14 (examples of "rectangular reflectors") are positioned parallel to each other within the hollow channel 28 to form a resonance cavity 30. The pair of flat mirrors 12 and 14 are formed to provide high light reflection. For example, in some implementations, the pair of flat mirrors 12 and 14 are configured to provide at least 99.9995% light refection, at most 5 parts per million light transmission and near zero light loss. In some implementations, the pair of flat mirrors 12 and 14 comprise a silicon substrate. For example, the pair of flat mirrors 12 and 14 may be made of an opaque silicon substrate that reflects MIR light but does not transmit MIR light. In alternate implementations, the pair of flat mirrors 12 and 14 may comprise another material configured to avoid absorption of the specific wavelength of light emitted by the light emitter 4. In some implementations, the pair of flat mirrors 12 and 14 are positioned along opposite inner walls of the hollow channel 28, as illustrated in FIG. 2. In some implementations, the pair of flat mirrors 12 and 14 are positioned parallel to a center axis 32 of the hollow channel 28 and/or the resonance cavity 30. For example, a reflective surface 34 of flat mirror 12 that faces the center axis 32 of the hollow channel 28 is positioned parallel to the center axis 32 of the hollow channel 28, as illustrated in FIG. 2. Further, a reflective surface 36 of flat mirror 14 that faces the center axis 32 of the hollow channel 28 is also positioned parallel to the center axis 32 of the hollow channel 28, as illustrated in FIG. 2.

In FIG. 2, the light input coupler 16 and the turning mirror 20 are positioned on opposite ends of flat mirror 14, and the light output coupler 22 and the turning mirror 18 are positioned on opposite ends of flat mirror 12. In some implementations, the pair of turning mirrors 18 and 20 (examples of "round reflectors") comprise a silicon substrate. For example, the pair of turning mirrors 18 and 20 may be made of an opaque silicon substrate that reflects MIR light but does not transmit MIR light. In alternate embodiments, the pair of turning mirrors 18 and 20 may comprise other materials such as, e.g., Germanium. In some implementations, the light input coupler 16 and the light output coupler 22 comprise a zinc selenide crystal substrate. For example, the light input coupler 16 and the light output coupler 22 may be made of a semi-transparent zinc selenide crystal substrate that both partially reflects and transmits MIR light. In some implementations, the light input coupler 16 and the light output coupler 22 are plano-convex mirrors and the pair of turning mirrors 18 and 20 and plano-plano mirrors. For example, the light input coupler 16 and the light output coupler 22 illustrated in FIG. 2 each include a convex side facing the resonance cavity 30.

Figure 3:
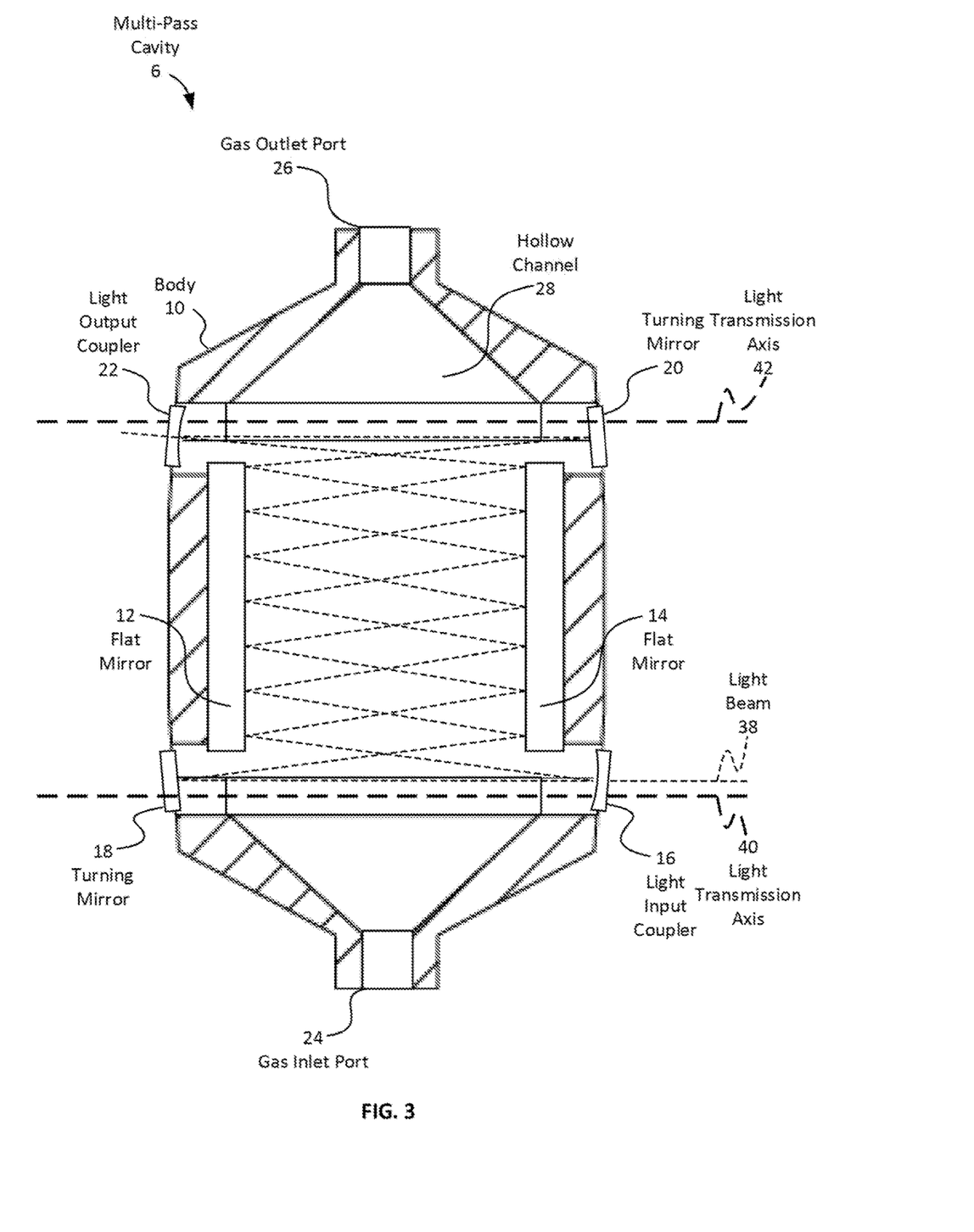
FIG. 3 is a sectional view of an example of a light beam traveling through the multi-pass cavity of FIG. 2, in accordance with some implementations of the present disclosure.

FIG. 3 is a sectional view of an example of light traveling through the multi-pass cavity 6. As illustrated in FIG. 3, a light beam 38 emitted, e.g., by the light emitter 4, along light transmission axis 40 enters the hollow channel 28 via the light input coupler 16. The light transmission axis 40 is positioned perpendicular to the center axis 32 of the hollow channel 28 and/or the resonance cavity 30. The turning mirror 18 (an example of a "first turning mirror") is configured to reflect the light beam 38 from the light transmission axis 40 to the resonance cavity 30. For example, the turning mirror 18 may reflect the light beam 38 from the light transmission axis 40 toward the reflective surface 36 of the flat mirror 14 as illustrated in FIG. 3. Upon entering the resonance cavity 30, the light beam 38 travels back and forth between the pair of flat mirrors 12 and 14 until it impacts the turning mirror 20. The light output coupler 22 is configured to receive the light beam 38 from the resonance cavity 30 and direct a portion of the light beam 38 out of the hollow channel 28. For example, the light output coupler 22 may direct a portion of the light beam 38 to the light detector 8. The light output coupler 22 is further configured reflect a portion of the light beam 38 along light transmission axis 42. The light transmission axis 42 is positioned substantially parallel to the light transmission axis 40 and perpendicular to the center axis 32 of the hollow channel 28 and/or the resonance cavity 30. The turning mirror 20 (an example of a "second turning mirror") is configured to reflect the light beam 38 from the light transmission axis 42 to the resonance cavity 30. For example, the turning mirror 20 may reflect the light beam 38 from the light transmission axis 42 toward the reflective surface 34 of the flat mirror 12 as illustrated in FIG. 3. Upon entering the resonance cavity 30, the light beam 38 travels back and forth between the pair of flat mirrors 12 and 14 until it impacts the light input coupler 16. The light input coupler 16 is configured to reflect the light beam 38 from the resonance cavity 30 to the light transmission axis 40. The portion of the light beam 38 reflected back through the resonance cavity 30 is constructively added to the portion of the light beam 38 received at the light input coupler 16 from outside the hollow channel 28 (e.g., emitted by the light emitter 4). As a result of this constructive interference, the intensity of the light beam 38 increases.

As illustrated in FIG. 3, the light beam 38 bounces 14 times in the resonance cavity 30. Every time the light beam 38 bounces off of a mirror, the light beam 38 suffers a loss (i.e., the light beam 38 loses energy). In conventional systems, the cumulative losses from 14 bounces degrades the light down to intensity levels that are unsuitable for high-sensitivity sensing. However, the multi-pass cavity 6 described in the present disclosure provides a high-transmissive, low-loss cavity with more bounces while keeping the light intensity level sufficiently high enough to allow high-sensitivity sensing (e.g., 500 parts per million). Compared to, e.g., a 4 bounce cavity, the multi-pass cavity 6 illustrated in FIG. 3 with 14 bounces can provide a similar optical path length with a reduced distance between the pair of flat mirrors 12 and 14. The reduced distance between the pair of flat mirrors 12 and 14 allows for a reduced overall footprint of the multi-pass cavity 6 as compared to a 4 bounce cavity that provides a similar optical length. For example, a 14 bounce implementation of the multi-pass cavity 6 may have an overall footprint that is 75% smaller than the overall footprint of a conventional 4 bounce cavity. In some implementations, the distance between the pair of flat mirrors 12 and 14 is less than 10 centimeters (e.g., approximately 7 centimeters).

Figure 4:
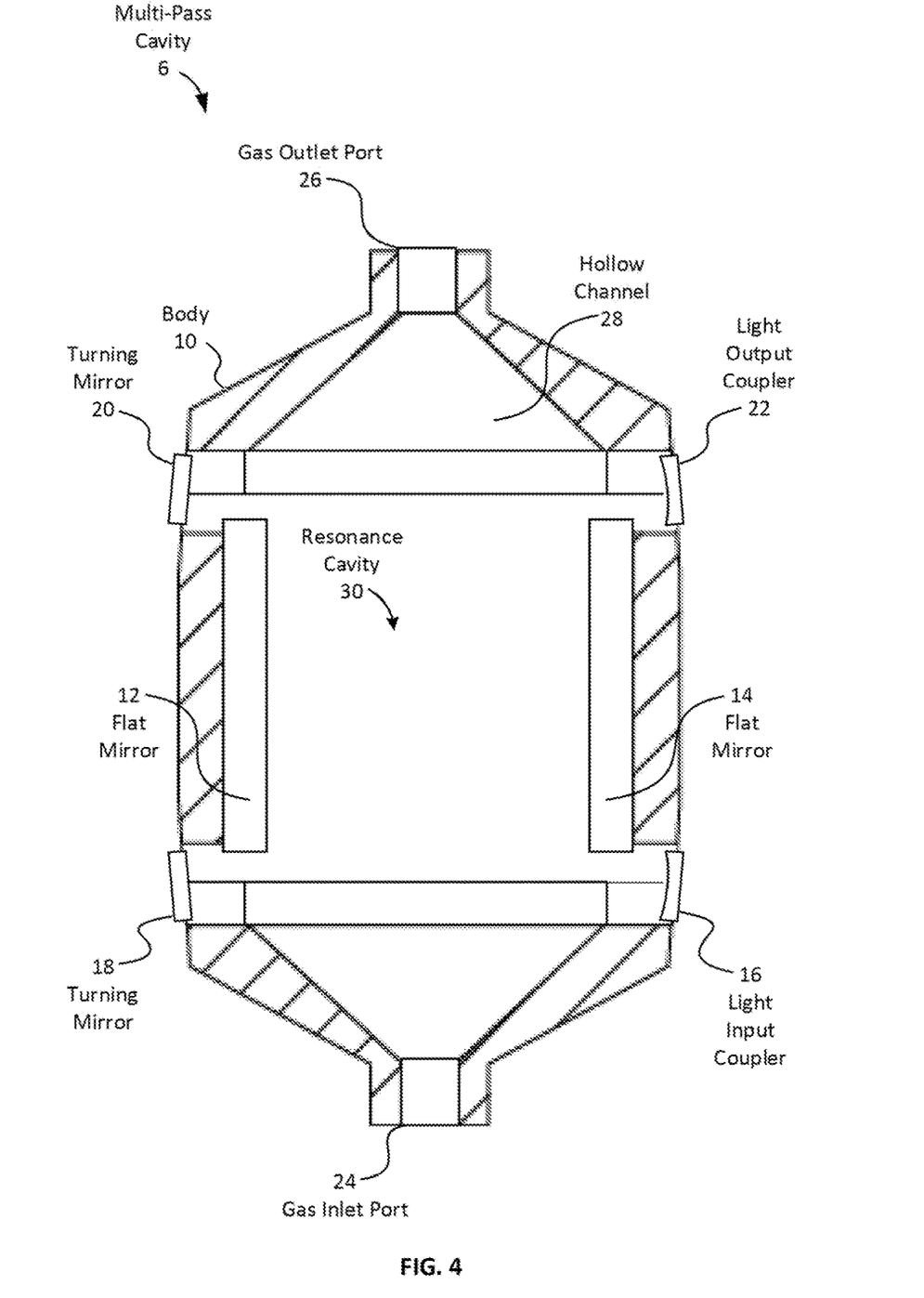
FIG. 4 is a sectional view of an example of a multi-pass cavity in which a light input coupler and a light output coupler are positioned on opposite ends of the same side of the cavity, in accordance with some implementations of the present disclosure.
Figure 5:
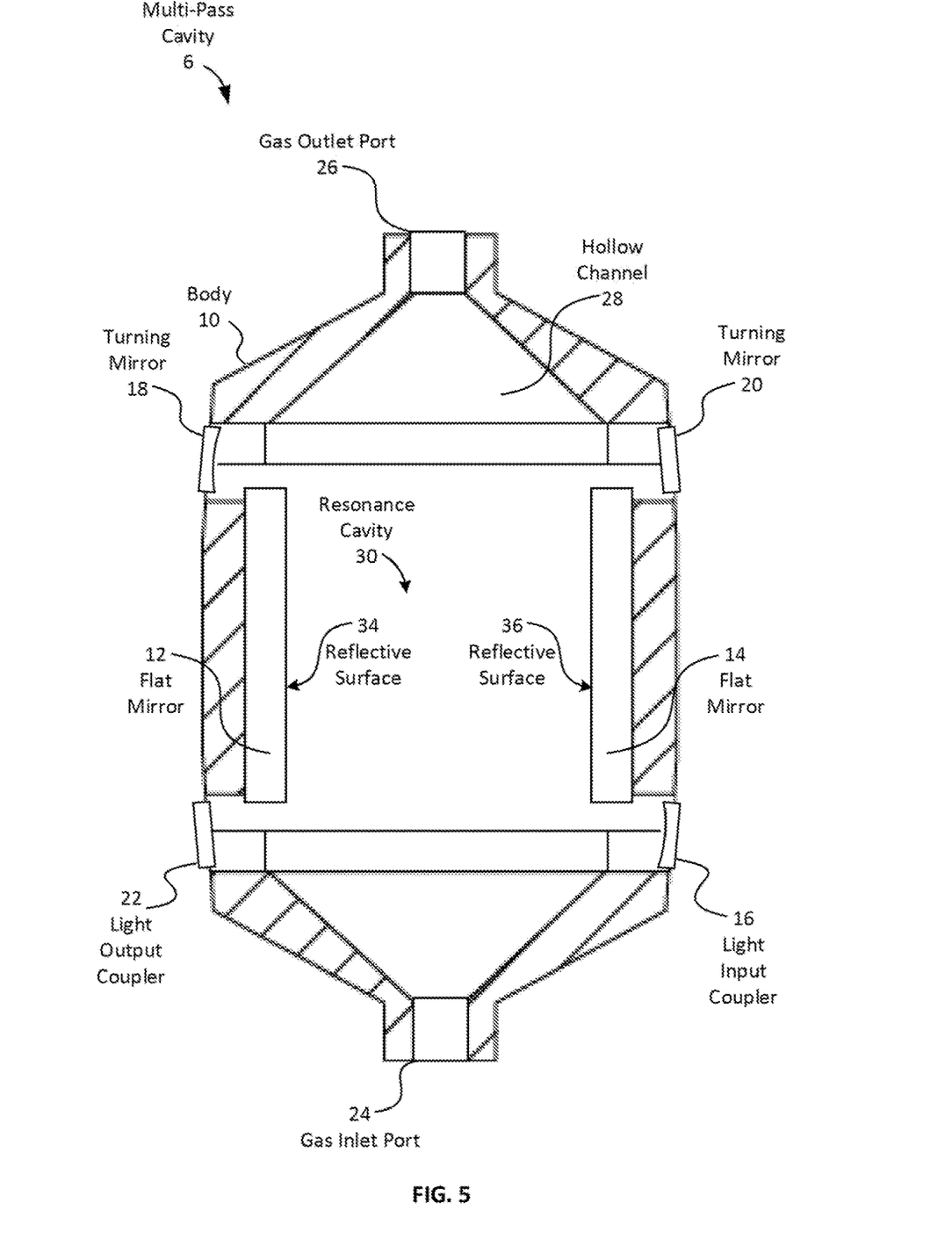
FIG. 5 is a sectional view of an example of a multi-pass cavity in which a light input coupler and a light output coupler are positioned on opposite sides of the same end of the cavity, in accordance with some implementations of the present disclosure.

The multi-pass cavity 6 may be positioned within instruments having different footprints. To minimize impact of the multi-pass cavity 6 on the specific footprint of an instrument while maintaining a target optical path length, the light input coupler 16 and the light output coupler 22 can be positioned at different corners of the multi-pass cavity 6. For example, in some implementations, the light input coupler 16 and the light output coupler 22 are positioned on opposite sides and on opposite ends of the body 10 as illustrated in FIGS. 2 and 3. In alternate implementations, the light input coupler 16 and the light output coupler 22 are positioned on opposite ends of the same side of the body 10. For example, the light input coupler 16 and the light output coupler 22 may be positioned on opposite ends of flat mirror 14 and the pair of turning mirrors 18 and 20 may be positioned on opposite ends of flat mirror 12, as illustrated in FIG. 4. Similar to FIGS. 2 and 3, the light input coupler 16 and the light output coupler 22 illustrated in FIG. 4 are plano-convex mirrors and the pair of turning mirrors 18 and 20 illustrated in FIG. 4 are plano-plano mirrors. In alternate implementations, the light input coupler 16 and the light output coupler 22 are positioned on opposite sides of the same end of the body 10 as illustrated in FIG. 5. The light input coupler 16 and the turning mirror 18 illustrated in FIG. 5 are plano-convex mirrors and the turning mirror 20 and the light output coupler 22 illustrated in FIG. 5 are plano-plano mirrors. The overall size of the multi-pass cavity 6 is scalable because the resonance cavity 30 is Gaussian.

Examples of recorded peak voltages (in millivolts) at different fall times (in nanoseconds) for implementation of the multi-pass cavity 6 with 7,564 nanometer and 8,220 nanometer optical path lengths are presented below in Tables 1 and 2, respectively. The fall times presented in Tables 1 and 2 represent the time elapsed between a signal traveling through the multi-pass cavity 6 falling from 90% peak voltage to 10%. The pulse frequency used to generate the date presented in Tables 1 and 2 is 250 kilohertz and the pulse width is 40 nanoseconds.

TABLE 1

Data for 7,564 Nanometer Optical Path Length

| Peak Voltage (millivolts) | Fall Time (nanoseconds) |
|---|---|
| 432 | 565 |
| 480 | 530 |
| 480 | 545 |
| 488 | 525 |
| 496 | 500 |
| 520 | 620 |
| 532 | 495 |
| 536 | 572 |
| 564 | 540 |
| 600 | 550 |

TABLE 2

Data for 8,220 Nanometer Optical Path Length

| Peak Voltage (millivolts) | Fall Time (nanoseconds) |
|---|---|
| 102 | 655 |
| 104 | 820 |
| 106 | 624 |
| 108 | 586 |
| 110 | 600 |
| 112 | 1210 |
| 116 | 565 |
| 120 | 640 |
| 120 | 1030 |
| 130 | 630 |

The average peak voltage and the average fall time of the data presented in Table 1 are 513 and 544, respectively. Further, the average peak voltage and average fall time of the data presented in Table 2 are 113 and 736, respectively.

Consistent with the above disclosure, the examples of systems and methods enumerated in the following clauses are specifically contemplated and are intended as a non-limiting set of examples.

Clause 1. A multi-pass cavity for cavity ring-down spectroscopy, the multi-pass cavity comprising:

a body including a gas channel formed between a first end of the body and a second end of the body opposite the first end;

a pair of flat mirrors positioned parallel to each other within the gas channel to form a resonance cavity;

a light input coupler configured to direct a light beam into the gas channel along a first light transmission axis perpendicular to a center axis of the resonance cavity;

a first turning mirror configured to reflect the light beam from the first light transmission axis toward the resonance cavity;

a light output coupler configured to:
  receive the light beam from the resonance cavity,
  direct a first portion of the light beam out of the gas channel, and
  reflect a second portion of the light beam along a second light transmission axis perpendicular to the center axis of the resonance cavity; and a second turning mirror configured to reflect the light beam from the second light transmission axis to the resonance cavity.

Clause 2. The multi-pass cavity of any clause herein, wherein the pair of flat mirrors, the light input coupler, the first turning mirror, the second turning mirror, and the light output coupler comprise super-polished mirrors.

Clause 3. The multi-pass cavity of any clause herein, wherein the light input coupler and the light output coupler are configured to provide at least 500 parts per million light transmission.

Clause 4. The multi-pass cavity of clause herein, wherein the light input coupler and the light output coupler are coated with an epitaxial coating to provide the at least 500 parts per million light transmission.

Clause 5. The multi-pass cavity of any clause herein, wherein a distance between the pair of flat mirrors is less than 10 centimeters.

Clause 6. The multi-pass cavity of any clause herein, wherein a first of the pair of flat mirrors is further positioned along an inner wall of the gas channel such that a first reflective surface of the first of the pair of flat mirrors faces and is positioned parallel to a center axis of the gas channel, and wherein a second of the pair of flat mirrors is further positioned along the inner wall of the gas channel such that a second reflective surface of the second of the pair of flat mirrors faces the center axis of the gas channel and is positioned parallel to the first reflective surface of the first of the pair of flat mirrors.

Clause 7. The multi-pass cavity of any clause herein, wherein the light input coupler and the light output coupler comprise a zinc selenide crystal substrate, and wherein the pair of flat mirrors, the first turning mirror, and the second turning mirror comprise a silicon substrate.

Clause 8. A system for cavity ring-down spectroscopy, the system comprising:

the multi-pass cavity of any clause herein;

a light emitter configured to emit the light beam; and a light detector configured to receive the light beam from the light output coupler.

Clause 9. The system of any clause herein, wherein the light emitter comprises a quantum cascade laser.

Clause 10. The multi-pass cavity of any clause herein, wherein the light input coupler and the second turning mirror are positioned on opposite ends of a first of the pair of flat mirrors, and wherein the light output coupler and the first turning mirror are positioned on opposite ends of a second of the pair of flat mirrors.

Clause 11. A multi-pass cavity for cavity ring-down spectroscopy, the multi-pass cavity comprising:
- a body including:
  - a gas inlet port positioned on a first end of the body,
  - a gas outlet port positioned on a second end of the body opposite the first end, and
  - a hollow channel formed between the gas inlet port and the gas outlet port;
- a first rectangular reflector positioned within the hollow channel and parallel to a center axis of the hollow channel;
- a second rectangular reflector positioned within the hollow channel and parallel to the first rectangular reflector to form a resonance cavity;
- a light input coupler configured to direct a light beam into the hollow channel along a first light transmission axis perpendicular to a center axis of the resonance cavity;
- a first round reflector configured to reflect the light beam from the first light transmission axis toward the resonance cavity;
- a light output coupler configured to:
  - receive the light beam from the resonance cavity,
  - direct a first portion of the light beam out of the hollow channel, and
  - reflect a second portion of the light beam along a second light transmission axis perpendicular to the center axis of the resonance cavity; and
- a second round reflector configured to reflect the light beam from the second light transmission axis to the resonance cavity.

Clause 12. The multi-pass cavity of any clause herein, wherein the first rectangular reflector, the second rectangular reflector, the light input coupler, the first round reflector, the second round reflector, and the light output coupler comprise super-polished mirrors.

Clause 13. The multi-pass cavity of any clause herein, wherein the light input coupler and the light output coupler are configured to provide at least 500 parts per million light transmission.

Clause 14. The multi-pass cavity of any clause herein, wherein the light input coupler and the light output coupler are coated with an epitaxial coating to provide the at least 500 parts per million light transmission.

Clause 15. The multi-pass cavity of any clause herein, wherein a distance between the first rectangular reflector and the second rectangular reflector is less than 10 centimeters.

Clause 16. The multi-pass cavity of any clause herein, wherein the first rectangular reflector is further positioned along an inner wall of the hollow channel such that a first reflective surface of the first rectangular reflector faces and is positioned parallel to the center axis of the hollow channel, and wherein the second rectangular reflector is further positioned along the inner wall of the hollow channel such that a second reflective surface of the second rectangular reflector faces the center axis of the hollow channel and is positioned parallel to the first reflective surface of the first rectangular reflector.

Clause 17. The multi-pass cavity of any clause herein, wherein the light input coupler and the light output coupler comprise a zinc selenide crystal substrate, and wherein the first rectangular reflector, the second rectangular reflector, the first round reflector, and the second round reflector comprise a silicon substrate.

Clause 18. A system for cavity ring-down spectroscopy, the system comprising:
- the multi-pass cavity of any clause herein;
- a light emitter configured to emit the light beam; and
- a light detector configured to receive the light beam from the light output coupler Clause 19. The system of any clause herein, wherein the light emitter comprises a quantum cascade laser.

Clause 20. The multi-pass cavity of any clause herein, wherein the light input coupler and the second round reflector are positioned on opposite ends of the first rectangular reflector, and wherein the light output coupler and the first round reflector are positioned on opposite ends of the second rectangular reflector.

No part of the description in this application should be read as implying that any particular element, step, or function is an essential element that must be included in the claim scope. The scope of patented subject matter is defined only by the claims. Moreover, none of the claims is intended to invoke 25 U.S.C. § 104(f) unless the exact words "means for" are followed by a participle.

The foregoing description, for purposes of explanation, use specific nomenclature to provide a thorough understanding of the described embodiments. However, it should be apparent to one skilled in the art that the specific details are not required to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Once the above disclosure is fully appreciated, numerous variations and modifications will become apparent to those skilled in the art. It is intended that the following claims be interpreted to embrace all such variations and modifications.

What is claimed is:

1. A multi-pass cavity for cavity ring-down spectroscopy, the multi-pass cavity comprising:
   - a body including a gas channel formed between a first end of the body and a second end of the body opposite the first end, wherein the first end and the second end are located along a center axis of a resonance cavity;
   - a pair of flat mirrors positioned parallel to each other within the gas channel to form a resonance cavity;
   - a light input coupler configured to direct a light beam into the gas channel along a first light transmission axis perpendicular to a center axis of the resonance cavity;
   - a first turning mirror configured to reflect the light beam from the first light transmission axis toward the resonance cavity;
   - a light output coupler configured to:
     - receive the light beam from the resonance cavity,
     - direct a first portion of the light beam out of the gas channel, and
     - reflect a second portion of the light beam along a second light transmission axis perpendicular to the center axis of the resonance cavity; and
   - a second turning mirror configured to reflect the light beam from the second light transmission axis to the resonance cavity.

2. The multi-pass cavity of claim 1, wherein the pair of flat mirrors, the light input coupler, the first turning mirror, the second turning mirror, and the light output coupler comprise super-polished mirrors.

3. The multi-pass cavity of claim 2, wherein the light input coupler and the light output coupler are configured to provide at least 500 parts per million light transmission.

4. The multi-pass cavity of claim 3, wherein the light input coupler and the light output coupler are coated with an epitaxial coating to provide the at least 500 parts per million light transmission.

5. The multi-pass cavity of claim 1, wherein a distance between the pair of flat mirrors is less than 10 centimeters.

6. The multi-pass cavity of claim 1, wherein a first of the pair of flat mirrors is further positioned along an inner wall of the gas channel such that a first reflective surface of the first of the pair of flat mirrors faces and is positioned parallel to a center axis of the gas channel, and wherein a second of the pair of flat mirrors is further positioned along the inner wall of the gas channel such that a second reflective surface of the second of the pair of flat mirrors faces the center axis of the gas channel and is positioned parallel to the first reflective surface of the first of the pair of flat mirrors.

7. The multi-pass cavity of claim 1, wherein the light input coupler and the light output coupler comprise a zinc selenide crystal substrate, and wherein the pair of flat mirrors, the first turning mirror, and the second turning mirror comprise a silicon substrate.

8. A system for cavity ring-down spectroscopy, the system comprising:
the multi-pass cavity of claim 1;
a light emitter configured to emit the light beam; and
a light detector configured to receive the light beam from the light output coupler.

9. The system of claim 8, wherein the light emitter comprises a quantum cascade laser.

10. The multi-pass cavity of claim 1, wherein the light input coupler and the second turning mirror are positioned on opposite ends of a first of the pair of flat mirrors, and wherein the light output coupler and the first turning mirror are positioned on opposite ends of a second of the pair of flat mirrors.

11. A multi-pass cavity for cavity ring-down spectroscopy, the multi-pass cavity comprising:
a body including:
a gas inlet port positioned on a first end of the body,
a gas outlet port positioned on a second end of the body opposite the first end, and
a hollow channel formed between the gas inlet port and the gas outlet port; a first rectangular reflector positioned within the hollow channel and parallel to a center axis of the hollow channel; a second rectangular reflector positioned within the hollow channel and parallel to the first rectangular reflector to form a resonance cavity; a light input coupler configured to direct a light beam into the hollow channel along a first light transmission axis perpendicular to a center axis of the resonance cavity; a first round reflector configured to reflect the light beam from the first light transmission axis toward the resonance cavity; a light output coupler configured to: receive the light beam from the resonance cavity, direct a first portion of the light beam out of the hollow channel, and reflect a second portion of the light beam along a second light transmission axis perpendicular to the center axis of the resonance cavity; and a second round reflector configured to reflect the light beam from the second light transmission axis to the resonance cavity,
has been changed to—a hollow channel formed between the gas inlet port and the gas outlet port, wherein the first end and the second end are located along a center axis of a resonance channel;
a first flat mirror positioned within the hollow channel and parallel to the center axis of the hollow channel;
a second flat mirror positioned within the hollow channel and parallel to the first flat mirror to form the resonance cavity;
a light input coupler configured to direct a light beam into the hollow channel along a first light transmission axis perpendicular to the center axis of the resonance cavity;
a first turning mirror configured to reflect the light beam from the first light transmission axis toward the resonance cavity;
a light output coupler configured to:
receive the light beam from the resonance cavity,
direct a first portion of the light beam out of the hollow channel, and
reflect a second portion of the light beam along a second light transmission axis perpendicular to the center axis of the resonance cavity; and
a second turning mirror configured to reflect the light beam from the second light transmission axis to the resonance cavity.

12. The multi-pass cavity of claim 11, wherein the first flat mirror, the second flat mirror, the light input coupler, the first turning mirror, the second turning mirror, and the light output coupler comprise super-polished mirrors.

13. The multi-pass cavity of claim 12, wherein the light input coupler and the light output coupler are configured to provide at least 500 parts per million light transmission.

14. The multi-pass cavity of claim 13, wherein the light input coupler and the light output coupler are coated with an epitaxial coating to provide the at least 500 parts per million light transmission.

15. The multi-pass cavity of claim 11, wherein a distance between the first flat mirror and the second flat mirror is less than 10 centimeters.

16. The multi-pass cavity of claim 11, wherein the first flat mirror is further positioned along an inner wall of the hollow channel such that a first reflective surface of the first flat mirror faces and is positioned parallel to the center axis of the hollow channel, and wherein the second flat mirror is further positioned along the inner wall of the hollow channel such that a second reflective surface of the second flat mirror faces the center axis of the hollow channel and is positioned parallel to the first reflective surface of the first flat mirror.

17. The multi-pass cavity of claim 11, wherein the light input coupler and the light output coupler comprise a zinc selenide crystal substrate, and wherein wherein the first flat mirror, the second flat mirror the first turning mirror, and the second turning mirror comprise a silicon substrate.

18. A system for cavity ring-down spectroscopy, the system comprising:
the multi-pass cavity of claim 11;
a light emitter configured to emit the light beam; and
a light detector configured to receive the light beam from the light output coupler.

19. The system of claim 18, wherein the light emitter comprises a quantum cascade laser.

20. The multi-pass cavity of claim 11, wherein the light input coupler and the second turning mirror are positioned on opposite ends of the first flat mirror, and wherein the light output coupler and the first turning mirror are positioned on opposite ends of the second flat mirror.

* * * * *